(No Model.)
E. LEUZINGER.
HAME TUG FASTENER.
No. 550,128. Patented Nov. 19, 1895.
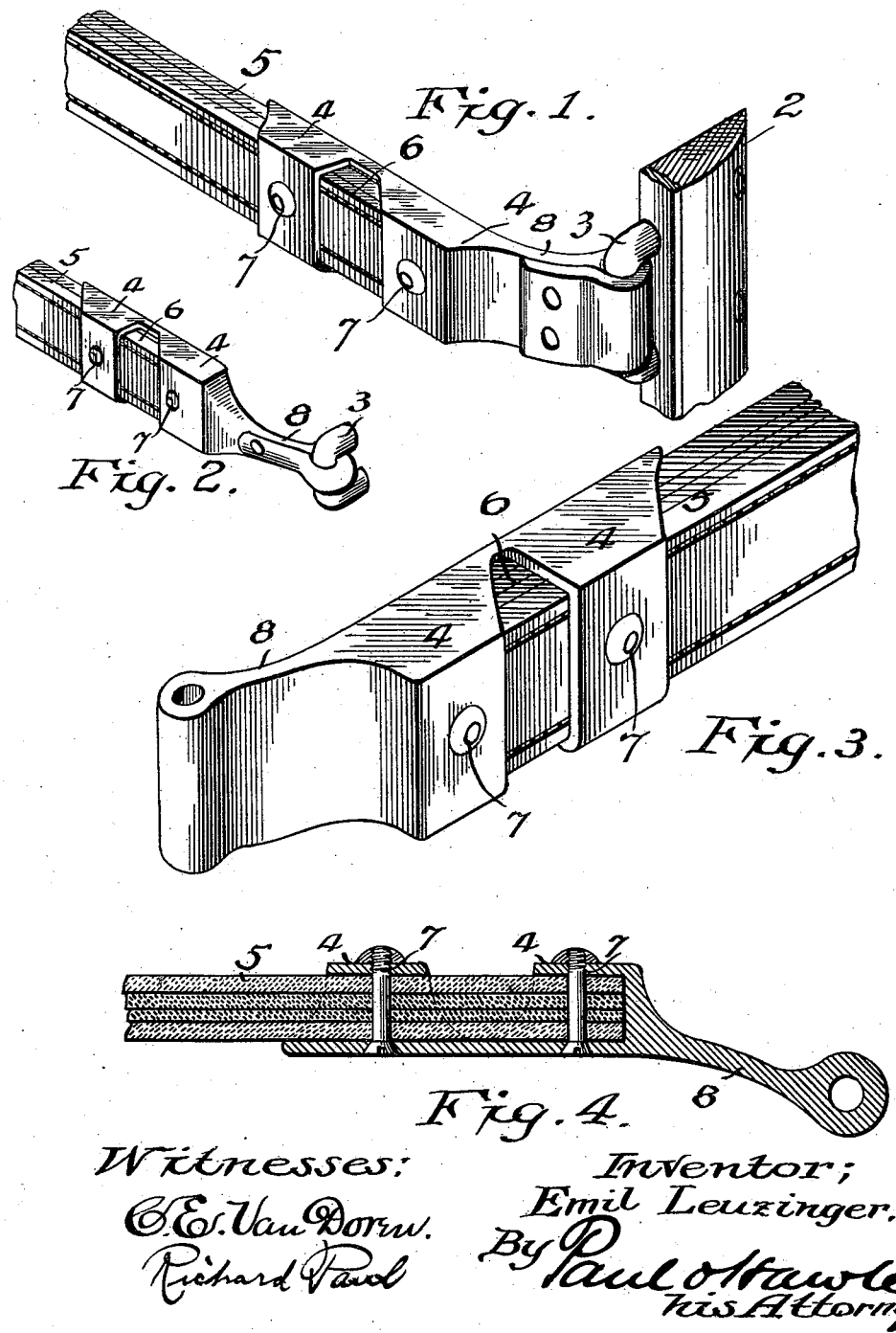
Witnesses:
C. E. Van Doren.
Richard Paul
Inventor;
Emil Leuzinger,
By Paul O. Hawley
his Attorneys.

UNITED STATES PATENT OFFICE.

EMIL LEUZINGER, OF MONTROSE, ASSIGNOR OF TWO-THIRDS TO FREDERICK W. RUPPELIUS AND JOHN J. LEUZINGER, JR., OF BRANDON, MINNESOTA.

HAME-TUG FASTENER.

SPECIFICATION forming part of Letters Patent No. 550,128, dated November 19, 1895.

Application filed June 10, 1895. Serial No. 552,205. (No model.)

*To all whom it may concern:*

Be it known that I, EMIL LEUZINGER, a citizen of the United States, residing at Montrose, in the county of Wright and State of Minnesota, have invented certain new and useful Improvements in Hame-Tug Fasteners, of which the following is a specification.

My invention relates to devices for connecting the tugs to the hames, and the object I have in view is to provide a small cast or wrought metal device having one end connected to the hames and its opposite end provided with a housing to receive the end of the tug, which may be detached therefrom at any time by removing the screws or rivets which hold the end of the tug within the housing.

My invention consists generally in various constructions and combinations, all as hereinafter described, and particularly pointed out in the claim.

In the accompanying drawings, forming part of the specification, Figure 1 is a perspective view of a device embodying my invention attached to a hame. Fig. 2 is a similar view of the device adapted for use with a light harness. Fig. 3 is a perspective of the device adapted for use with a heavy harness and showing a different method of attaching the same to the hames. Fig. 4 is a longitudinal section of Fig. 3.

In the drawings, 2 represents a portion of one side of a hame provided with the usual hook or eye 3, into which the end of the tug-fastener is hooked. The tug-fastener consists of a wrought or cast metal portion, having a housing 4 at one end to receive the end of the tug 5, said housing being provided with a transverse slot or opening 6, which extends nearly to the inner face of the fastener, and upon each side of the slot or opening are provided holes or openings 7, through which screws or rivets are passed and through similar holes in the end of the tug, whereby the same is securely fastened within the housing.

If screws are used, small nuts are provided upon the opposite threaded end of the screw to hold the same within the openings or holes in the housing, as shown in Fig. 4, and the use of the screws permits the ready removal of the end of the tug from the housing at any time.

In place of the screws for securing the end of the tug in the housing rivets may be used and the tug fastened permanently.

From the inner end of the housing 4 the fastener is bent slightly, forming the inwardly-curved portion 8, and the end of the fastener is passed through the loop 3 on the hame and securely riveted to the curved portion 8, as shown in Fig. 1.

In Fig. 3 I have shown a form of fastener adapted for use with a heavy harness, and in which the curved end is provided with a vertical hole or opening to receive a bolt or pin that is passed down through eyes provided on the hame above and below the end of the fastener. This construction permits the fastener to be detached from the hame at any time.

In Fig. 2 I have shown a smaller size of fastener adapted for use with a light hame, and in which the end of the fastener is bent into a loop to pass through the eye of the hame and is then secured to the curved portion by a single rivet. The curved portion 8 of the fastener fits over the edge of the collar, which forms a bearing-surface for that part of the fastener, and while I have shown the fastener secured to the hame with rivets, I do not limit myself to this exact method of connecting the hame and fastener; as other means may be used with equally good results.

Having thus described my invention, I claim as new and desire to secure by Letters Patent—

The combination in a hame-tug fastener, of a metal portion in the frame of the housing or case, having a closed forward end and substantially rectangular in cross section, said case adapted to receive the forward end of the tug, rivets or bolts passing through the case whereby a tug may be secured therein, and a curved projection from the closed forward end of the case or housing, the same curving inwardly and provided with means at its end whereby it may be conveniently attached to the hame, substantially as described.

In testimony whereof I have hereunto set my hand this 31st day of May, A. D. 1895.

EMIL LEUZINGER.

In presence of—
C. G. HAWLEY,
RICHARD PAUL.